US011527008B2

(12) United States Patent
Fujii et al.

(10) Patent No.: US 11,527,008 B2
(45) Date of Patent: Dec. 13, 2022

(54) ROBOT CONTROL DEVICE, ROBOT CONTROL METHOD, AND ROBOT CONTROL PROGRAM

(71) Applicant: OMRON Corporation, Kyoto (JP)

(72) Inventors: Haruka Fujii, Uji (JP); Toshihiro Moriya, Tokyo (JP); Takeshi Kojima, Kyoto (JP); Norikazu Tonogai, Nara (JP)

(73) Assignee: OMRON Corporation, Kyoto (JP)

( * ) Notice: Subject to any disclaimer, the term of this patent is extended or adjusted under 35 U.S.C. 154(b) by 851 days.

(21) Appl. No.: 16/410,213

(22) Filed: May 13, 2019

(65) Prior Publication Data

US 2019/0385329 A1 Dec. 19, 2019

(30) Foreign Application Priority Data

Jun. 13, 2018 (JP) .............................. JP2018-112794

(51) Int. Cl.
*G06T 7/70* (2017.01)
*B25J 9/16* (2006.01)
(Continued)

(52) U.S. Cl.
CPC .............. *G06T 7/70* (2017.01); *B25J 9/1697* (2013.01); *G06T 7/0004* (2013.01); *G06T 7/13* (2017.01);
(Continued)

(58) Field of Classification Search
CPC .... G06T 7/70; G06T 7/13; G06T 7/004; B25J 9/1687; B25J 9/1697; B25J 9/1679;
(Continued)

(56) References Cited

U.S. PATENT DOCUMENTS 10,040,199 B2 * 8/2018 Ito ........................... B25J 9/1697
10,857,673 B2 * 12/2020 Atohira ................ B65G 47/905
(Continued)

FOREIGN PATENT DOCUMENTS

CN         103042529 A      4/2013
CN         104802186 A      7/2015
(Continued)

OTHER PUBLICATIONS

Extended European search report dated Jan. 30, 2020 in a counterpart European patent application.
(Continued)

*Primary Examiner* — Rowina J Cattungal
(74) *Attorney, Agent, or Firm* — Metrolex IP Law Group PLLC

(57) ABSTRACT

A robot control device includes an obtaining unit that obtains, from an image sensor that captures a workpiece group to be handled by a robot, a captured image, a simulation unit that simulates operation of the robot, and a control unit that performs control such that the captured image is obtained if, in the simulation, the robot is retracted from an image capture forbidden space, in which an image is potentially captured with the workpiece group and the robot overlapping each other, and which is set based on either or both a first space being the visual field range of the image sensor, and a columnar second space obtained by taking a workpiece region including the workpiece group or each of divided regions into which the workpiece region is divided, as a bottom area, and extending the bottom area to the position of the image sensor.

12 Claims, 12 Drawing Sheets

(51) Int. Cl.
  *G06T 7/00*   (2017.01)
  *G06T 7/13*   (2017.01)
  *H04N 5/232*  (2006.01)

(52) U.S. Cl.
  CPC ............... *H04N 5/23203* (2013.01); *G06T 2207/30164* (2013.01); *G06T 2207/30168* (2013.01)

(58) Field of Classification Search
  CPC .......... B25J 13/08; G05B 2219/37555; G05B 2219/4005
  See application file for complete search history.

(56) References Cited

U.S. PATENT DOCUMENTS

| | | | |
|---|---|---|---|
| 2004/0019405 A1* | 1/2004 | Ban | B25J 9/1697 700/213 |
| 2004/0117066 A1 | 6/2004 | Ban et al. | |
| 2006/0149421 A1* | 7/2006 | Akiyama | B25J 9/1664 700/245 |
| 2008/0312771 A1 | 12/2008 | Sugiura | |
| 2011/0301744 A1* | 12/2011 | Ichimaru | B25J 9/1687 700/214 |
| 2012/0158180 A1* | 6/2012 | Iio | B25J 9/1679 901/31 |
| 2013/0094932 A1 | 4/2013 | Kutsukake et al. | |
| 2013/0166061 A1 | 6/2013 | Yamamoto | |
| 2013/0218324 A1 | 8/2013 | Furuya | |
| 2014/0277694 A1 | 9/2014 | Ichimaru | |
| 2015/0209963 A1 | 7/2015 | Atohira et al. | |
| 2016/0253562 A1 | 9/2016 | Yuki et al. | |

FOREIGN PATENT DOCUMENTS

| | | |
|---|---|---|
| CN | 105922268 A | 9/2016 |
| JP | 2002-273675 A | 9/2002 |
| JP | 2004-160567 A | 6/2004 |
| JP | 2008-030136 A | 2/2008 |
| JP | 2011-131303 A | 7/2011 |
| JP | 2013-086184 A | 5/2013 |
| JP | 2013-132742 A | 7/2013 |

OTHER PUBLICATIONS

Office Action dated Aug. 31, 2021 in a counterpart Japanese patent application.
Office Action (CNOA) dated Apr. 1, 2022 in a counterpart Chinese patent application, with English translation.

* cited by examiner

ROBOT CONTROL DEVICE, ROBOT CONTROL METHOD, AND ROBOT CONTROL PROGRAM

CROSS-REFERENCES TO RELATED APPLICATIONS

This application claims priority to Japanese Patent Application No. 2018-112794 filed Jun. 13, 2018, the entire contents of which are incorporated herein by reference.

FIELD

The disclosure relates to a robot control device, a robot control method, and a robot control program.

BACKGROUND

Pick-and-place devices are an example of devices for transporting workpieces such as parts and products in factory manufacturing lines or the like (see JP 2011-131303A, for example). A pick-and-place device transports, while holding, a workpiece to a destination, and places it down. A workpiece to be held is determined based on an image of a workpiece group captured from above by an image sensor. Furthermore, when the image sensor is used, an image of the workpiece group needs to be captured in a state in which a robot arm is retracted from the space above the workpiece group so that the robot arm is prevented from appearing in the captured image while overlapping the workpiece group.

Moreover, in the pick-and-place device, it is required to reduce the cycle time from a point in time when a workpiece is picked up at a predetermined position to a point in time when it is placed at a destination, in order to improve the productivity. Typically, in order to reduce the cycle time of the pick-and-place device, it is preferable to promptly start image capture of the image sensor at a timing at which the robot arm has been retracted from the space above the workpiece group.

JP 2011-131303A and JP 2008-30136A are examples of background art.

However, the timing at which the robot arm has been retracted from the space above the workpiece group varies depending on the position of a workpiece to be held and the time required to hold the workpiece, and thus it is difficult to estimate it. accordingly, conventionally, image capture is started at a timing at which the robot arm is clearly not present above the workpieces, that is, at a fixed timing such as, for example, a few seconds later after a workpiece is picked up. Thus, it is difficult to reduce the cycle time.

It is conceivable to provide, in addition to the image sensor for capturing an image of a workpiece group, a separate sensor for specifying the timing at which the robot arm is retracted from the space above the workpiece group, but this may cause the problems that the number of constituent components increases and the cost for the device becomes high.

SUMMARY

One or more aspects have been made in view of the aforementioned problems, and may provide a robot control device, a robot control method, and a robot control program that can promptly obtain a captured image at a timing at which a robot has been retracted from an image capture forbidden space, in which an image is potentially captured with the robot and a workpiece group to be handled by the robot overlapping each other.

According to one or more aspects, a robot control device includes: an obtaining unit configured to obtain a captured image from an image sensor configured to capture an image of a workpiece group to be handled by a robot; a simulation unit configured to execute simulation of operation of the robot; and a control unit configured to perform control such that an image captured by the image sensor is obtained if, in the simulation, the robot is retracted from at least one image capture forbidden space, in which an image is potentially captured with the workpiece group and the robot overlapping each other, the image capture forbidden space being a space set based on either or both a first space, which is a visual field range of the image sensor, and at least one columnar second space, which is obtained by taking a workpiece region including the workpiece group or each of a plurality of divided regions into which the workpiece region is divided, as a bottom area, and extending the bottom area to the position of the image sensor.

Furthermore, the image capture forbidden space may be a space in which the first space and the second space overlap each other.

Furthermore, the control unit may calculate the second space with a bottom area having a shape in which an outline of the workpiece group is contained, and calculate, as the image capture forbidden space, a space in which the calculated second space and the first space overlap each other.

Furthermore, the shape in which an outline of the workpiece group is contained may be given by a contour that indicates the outline of the workpiece group, or may be a shape that encloses the contour of the workpiece group.

Furthermore, the shape that encloses the contour of the workpiece group may be a circumscribed shape that circumscribes the outline of the workpiece group or an inner edge shape of a receptacle in which the workpiece group is accommodated.

Furthermore, the image sensor may be an image sensor configured to capture a still image, and the control unit may control the image sensor to start image capture at a timing at which, in the simulation, the robot has been retracted from the image capture forbidden space.

Furthermore, the image sensor may be an image sensor configured to capture a moving image, and the control unit may perform control such that a frame image is obtained based on the moving image captured by the image sensor at a timing at which, in the simulation, the robot has been retracted from the image capture forbidden space.

Furthermore, a plurality of image capture forbidden spaces may be set, and the control unit may perform control such that an image captured by the image sensor is obtained if the robot is retracted from at least one of the plurality of image capture forbidden spaces.

Furthermore, at least two of the plurality of image capture forbidden spaces may partially overlap each other when viewed in a direction in which the image sensor captures an image.

Furthermore, if the robot arm of the robot is retracted to a reference position at which the robot arm does not affect the layout of the workpiece group, and, out of image capture forbidden spaces that correspond to the divided regions, there is any image capture forbidden space in which a workpiece is present but the robot arm is not present, the control unit may perform control such that an image captured by the image sensor is obtained.

According to one or more aspects, a robot control method includes: an obtaining step of obtaining a captured image from an image sensor configured to capture an image of a workpiece group to be handled by a robot; a simulation step of executing a simulation of operation of the robot; a control step of performing control such that an image captured by the image sensor is obtained if, in the simulation, the robot is retracted from at least one image capture forbidden space, in which an image is potentially captured with the workpiece group and the robot overlapping each other, the image capture forbidden space being a space set based on either or both a first space, which is a visual field range of the image sensor, and at least one columnar second space, which is obtained by taking a workpiece region including the workpiece group or each of a plurality of divided regions into which the workpiece region is divided, as a bottom area, and extending the bottom area to the position of the image sensor.

According to one or more aspects, a robot control program is a program for causing a computer to function as: an obtaining unit configured to obtain a captured image from an image sensor configured to capture an image of a workpiece group to be handled by a robot; a simulation unit configured to execute simulation of operation of the robot; and a control unit configured to perform control such that an image captured by the image sensor is obtained if, in the simulation, the robot is retracted from at least one image capture forbidden space, in which an image is potentially captured with the workpiece group and the robot overlapping each other, the image capture forbidden space being a space set based on either or both a first space, which is a visual field range of the image sensor, and at least one columnar second space, which is obtained by taking a workpiece region including the workpiece group or each of a plurality of divided regions into which the workpiece region is divided, as a bottom area, and extending the bottom area to the position of the image sensor.

According to one or more aspects, it is possible to promptly obtain a captured image at a timing at which a robot has been retracted from an image capture forbidden space, in which an image is potentially captured with the robot and a workpiece group to be handled by the robot overlapping each other.

DETAILED DESCRIPTION

Figure 1:
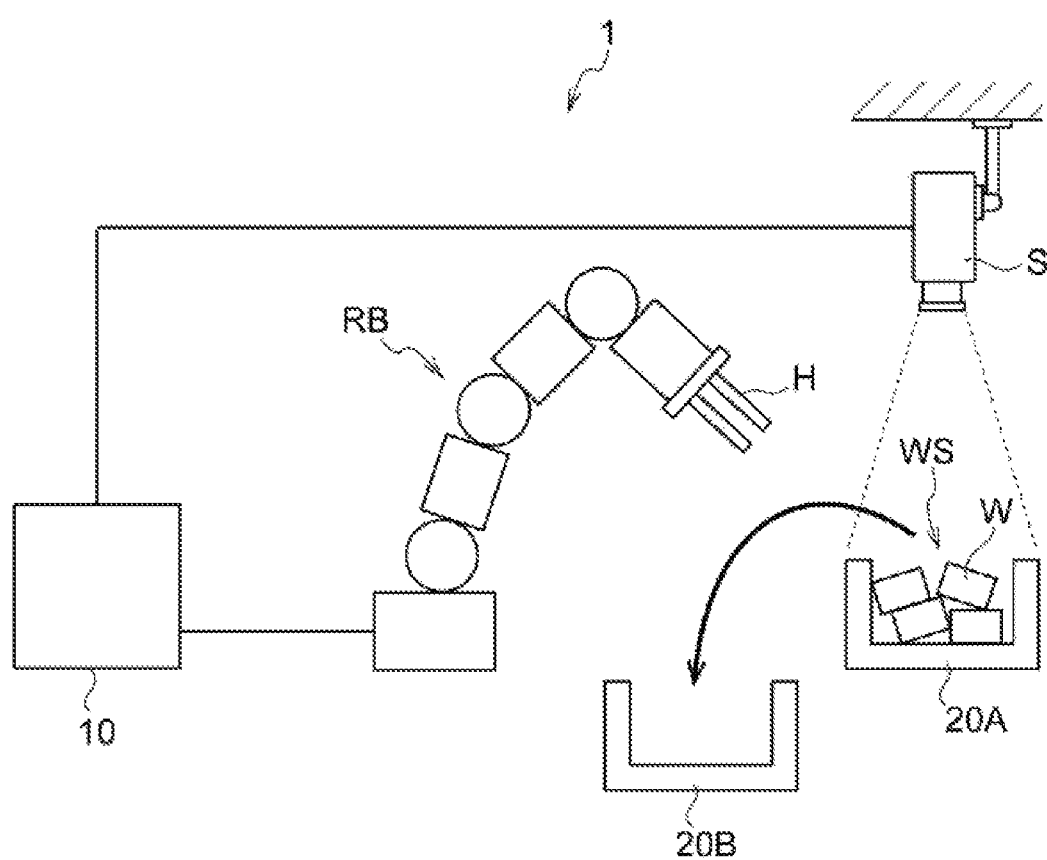
FIG. 1 is a diagram schematically illustrating a configuration of a pick-and-place device.

Hereinafter, an example of an embodiment will be described with reference to the drawings. Note that the same reference numerals are given to the same or equivalent constituent components or parts in the drawings. Furthermore, for illustrative reasons, the scaling of the drawings may be exaggerated and may be different from the actual scale.

FIG. 1 is a diagram showing a configuration of a pick-and-place device 1 according to one or more embodiments. As shown in FIG. 1, the pick-and-place device 1 is provided with a robot RB, an image sensor S, and a robot control device 10.

The robot RB picks up a workpiece W selected from a workpiece group WS, which is a group of workpieces W received in a box-shaped receptacle 20A, transports the held workpiece W to another box-shaped receptacle 20B, and places it into the receptacle 20B. Hereinafter, an operation of picking up a workpiece W is referred to as a "pick-up operation". Also, an operation of placing a workpiece W is referred to as a "placing operation".

In one or more embodiments, as an example, a robot hand H, serving as an end effector, is attached to a leading end of a robot arm of the robot RB, and the robot hand H holds, by gripping, a workpiece W received in the receptacle 20A. Then, the robot RB transports, while holding, the workpiece W to the other receptacle 20B, and releases and places the held workpiece W. Note that the member that holds a workpiece W is not limited to the robot hand H, and may be a suction pad that suctions the workpiece W.

The image sensor S is set at a position above the workpiece group WS at which it can capture an image of an area including the workpiece group WS. The image sensor S is a camera that captures a still image of the workpiece group WS in accordance with an instruction of the robot control device 10. Note that, as the image sensor S, a stereo camera may also be employed that captures images of an object from different directions at the same time.

The robot control device 10 subjects a captured image obtained from the image sensor S to image processing, and recognizes the position and orientation of a workpiece W to be picked up based on a result of the image processing. Then, the robot control device 10 generates a planned path specifying a path from a position at which the robot RB picks up the workpiece W from the receptacle 20A to a position at which the robot RB places it into the receptacle 20B. The robot control device 10 outputs an operation instruction value to the robot RB so that the robot RB operates in accordance with the generated planned path.

The following will describe the robot RB. In one or more embodiments, a case will be described in which the robot RB is a vertically articulated robot, but one or more aspects is also applicable to a horizontal articulated robot (SCARA robot), a parallel link robot, and the like.

Figure 2:
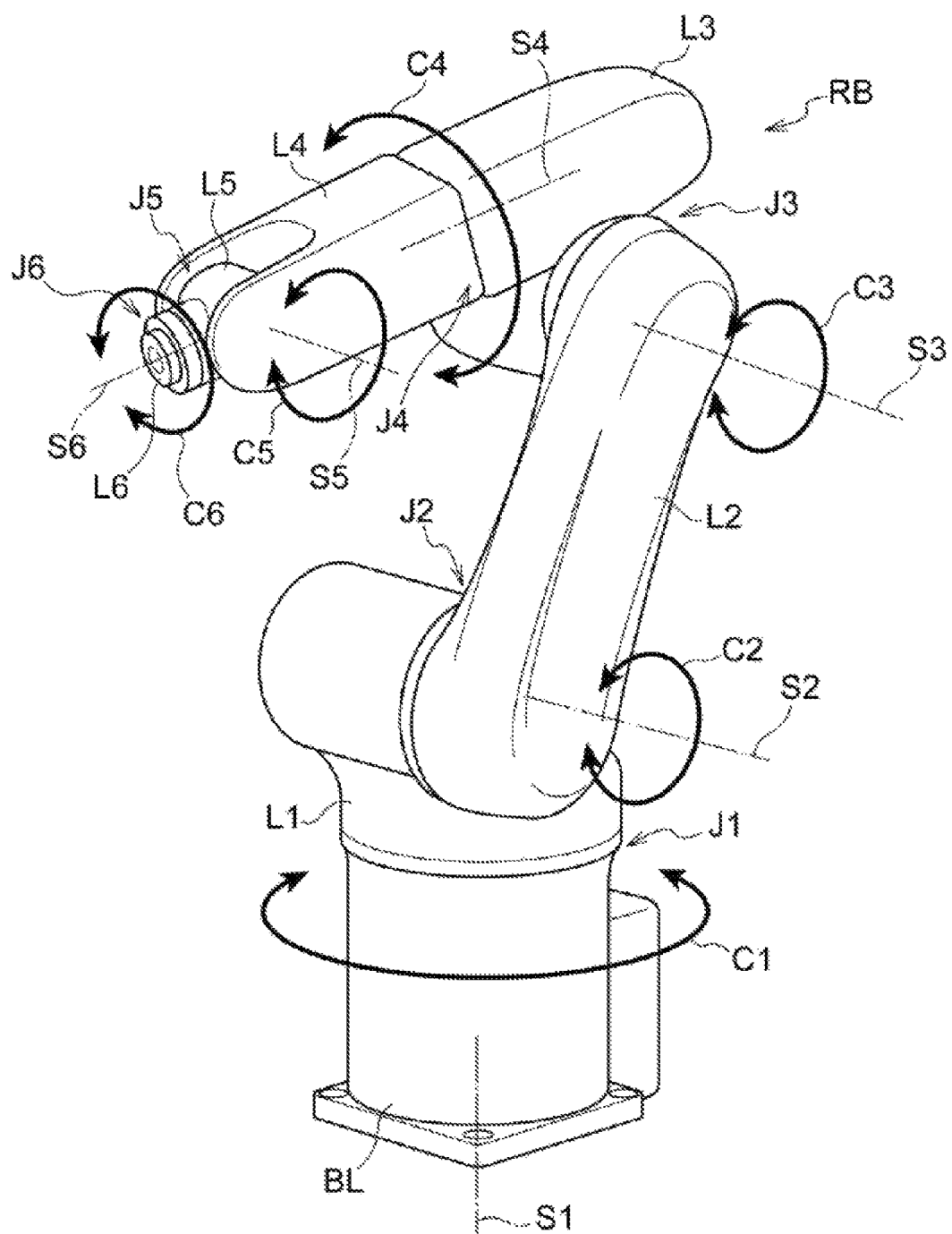
FIG. 2 is a diagram of a perspective view illustrating an example of a vertically articulated robot.

FIG. 2 is a diagram showing a configuration of the robot RB, which is a vertically articulated robot. As shown in FIG. 2, the robot RB is a six-axis robot with a six degrees of freedom, including a base link BL, links L1 to L6, and joints J1 to J6. Note that "joint" refers to a joint that connects links to each other. Note that, in the following, "robot arm" is a term referring to an object including the links L1 to L6, and the robot hand H connected to the link L6.

The base link BL and the link L1 are connected to each other via the joint J1, which rotates about a vertical axis Si in a direction of an arrow C1 in FIG. 2. accordingly, the link L1 rotates in the direction of the arrow C1 with the base link BL as a fulcrum.

The link L1 and the link L2 are connected to each other via the joint J2, which rotates about a horizontal axis S2 in a direction of an arrow C2 in FIG. 2. accordingly, the link L2 rotates in the direction of the arrow C2 with the link L1 as a fulcrum.

The link L2 and the link L3 are connected to each other via the joint J3, which rotates about an axis S3 in a direction of an arrow C3 in FIG. 2. accordingly, the link L3 rotates in the direction of the arrow C3 with the link L2 as a fulcrum.

The link L3 and the link L4 are connected to each other via the joint J4, which rotates about an axis S4 in a direction of an arrow C4 in FIG. 2. accordingly, the link L4 rotates in the direction of the arrow C4 with the link L3 as a fulcrum.

The link L4 and the link L5 are connected to each other via the joint J5, which rotates about an axis S5 in a direction of an arrow C5 in FIG. 2. accordingly, the link L5 rotates in the direction of the arrow C5 with the link L4 as a fulcrum.

The link L5 and the link L6 are connected to each other via the joint J6, which rotates about an axis S6 in a direction of an arrow C6 in FIG. 2. accordingly, the link L6 rotates in the direction of the arrow C6 with the link L5 as a fulcrum. Note that the robot hand H, although not shown in FIG. 2, is attached to the link L6.

For each of the joints J1 to J6, a predetermined rotation angle range of −180 degrees to +180 degrees is set as a range of motion.

The orientation (posture) of the robot RB depends on the rotation angles of the joints J1 to J6.

Figure 3:
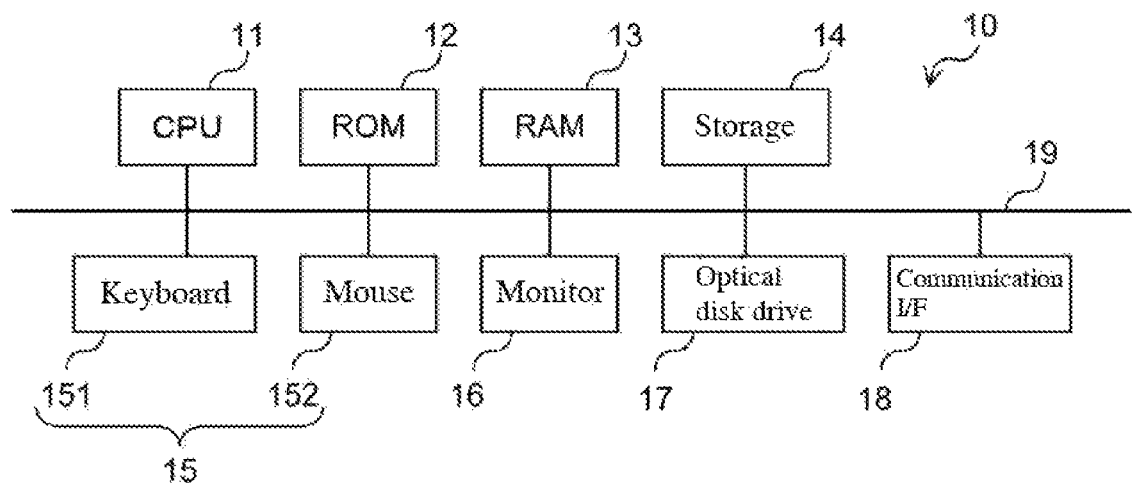
FIG. 3 is a diagram illustrating a configuration of an example of a hardware configuration of a robot control device.

FIG. 3 is a block diagram showing a hardware configuration of the robot control device 10 according to one or more embodiments.

As shown in FIG. 3, the robot control device 10 includes a central processing unit (CPU) 11, a read only memory (ROM) 12, a random access memory (RAM) 13, a storage 14, an input unit 15, a monitor 16, an optical disk drive 17, and a communication interface 18. The constituent components are communicably connected to each other via a bus 19.

In one or more embodiments, a robot control program for executing robot control processing is stored in the ROM 12 or the storage 14. The CPU 11 is a central processing unit, and is configured to execute various types of programs and control the constituent components, for example. In other words, the CPU 11 reads programs from the ROM 12 or the storage 14, and executes the read programs in the RAM 13 serving as a work area. The CPU 11 controls the constituent components and executes the various types of arithmetic processing in accordance with the programs stored in the ROM 12 or the storage 14.

Note that the CPU 11 is a processor that can execute a plurality of processes in parallel to each other. Examples of such a processor include a multi-core CPU. Furthermore, the CPU 11 may be a processor that can execute a plurality of processes in parallel to each other based on a multi-task operating system.

The ROM 12 stores various types of programs and various types of data. The RAM 13 serves as a work area to temporarily store a program or data. The storage 14 is constituted by a hard disk drive (HDD) or a solid state drive (SSD), and stores various types of programs including an operating system, and various types of data.

The input unit 15 includes a keyboard 151, and a pointing device such as a mouse 152, and is used to perform various types of input. The monitor 16 is, for example, a liquid crystal display, and displays various types of information. The monitor 16 may also employ a touch panel method, so as to also function as the input unit 15. The optical disk drive 17 reads data stored in various types of recording media (such as CD-ROMs or blue-ray discs), and writes data into the recording media, for example.

The communication interface 18 is an interface for communicating with another device such as the robot RB and the image sensor S, and uses a standard such as the Ethernet (registered trademark) standard, an FDDI standard, or a Wi-Fi (registered trademark) standard.

Hereinafter, functional configurations of the robot control device 10 will be described.

Figure 4:
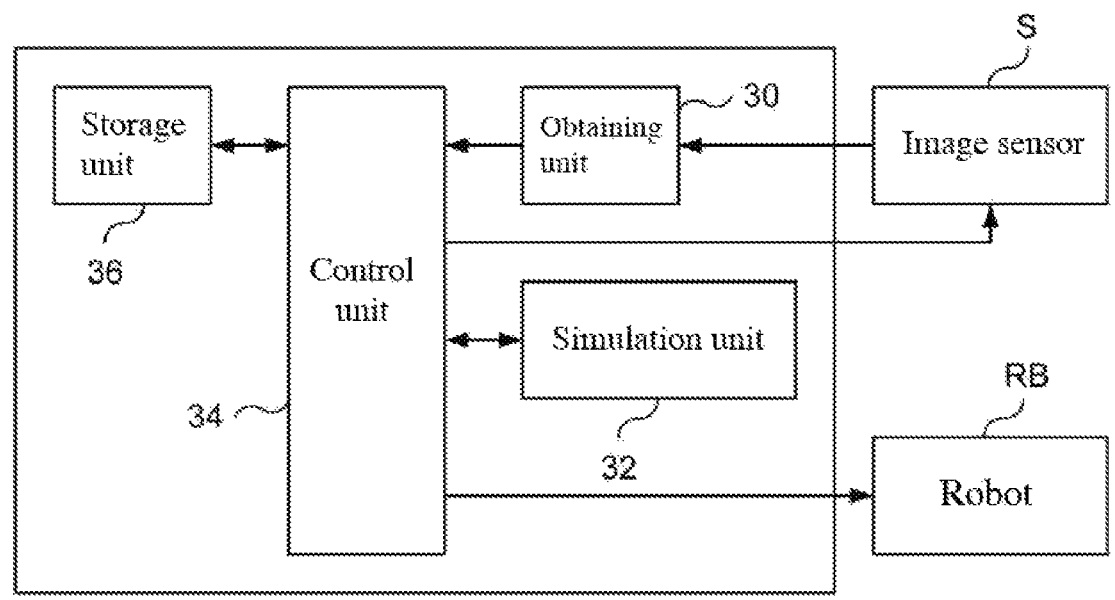
FIG. 4 is a block diagram illustrating an example of a functional configuration of a robot control device.

FIG. 4 is a block diagram showing examples of the functional configuration of the robot control device 10.

As shown in FIG. 4, the robot control device 10 includes, as functional elements, an obtaining unit 30, a simulation unit 32, a control unit 34, and a storage unit 36. The functional elements are realized by the CPU 11 reading the robot control program stored in the ROM 12 or the storage 14, expanding the read robot control program onto the RAM 13, and executing it.

The obtaining unit 30 obtains a captured image from the image sensor S that captures an image of the workpiece group WS to be handled by the robot RB.

The simulation unit 32 simulates the operation of the robot RB.

The control unit 34 performs control such that an image captured by the image sensor S is obtained (only) if, in the simulation made by the simulation unit 32, the robot RB has (just) been retracted from an image capture forbidden space in which an image is potentially captured with the workpiece group WS and the robot RB overlapping each other, the image capture forbidden space being a space that is set based on at least one of a visual field range of the image sensor S and the shape of a region including the workpiece group WS.

The storage unit 36 stores various types of information such as a robot control processing program, information relating to the visual field range of the image sensor S, data on the shapes of the base link BL and the links L1 to L6 of the robot RB, information relating to the ranges of motion of the joints J1 to J6, data on the shape of the robot hand H, and data on the shape of workpieces W.

Hereinafter, effects of the robot control device 10 will be described.

Figure 5:
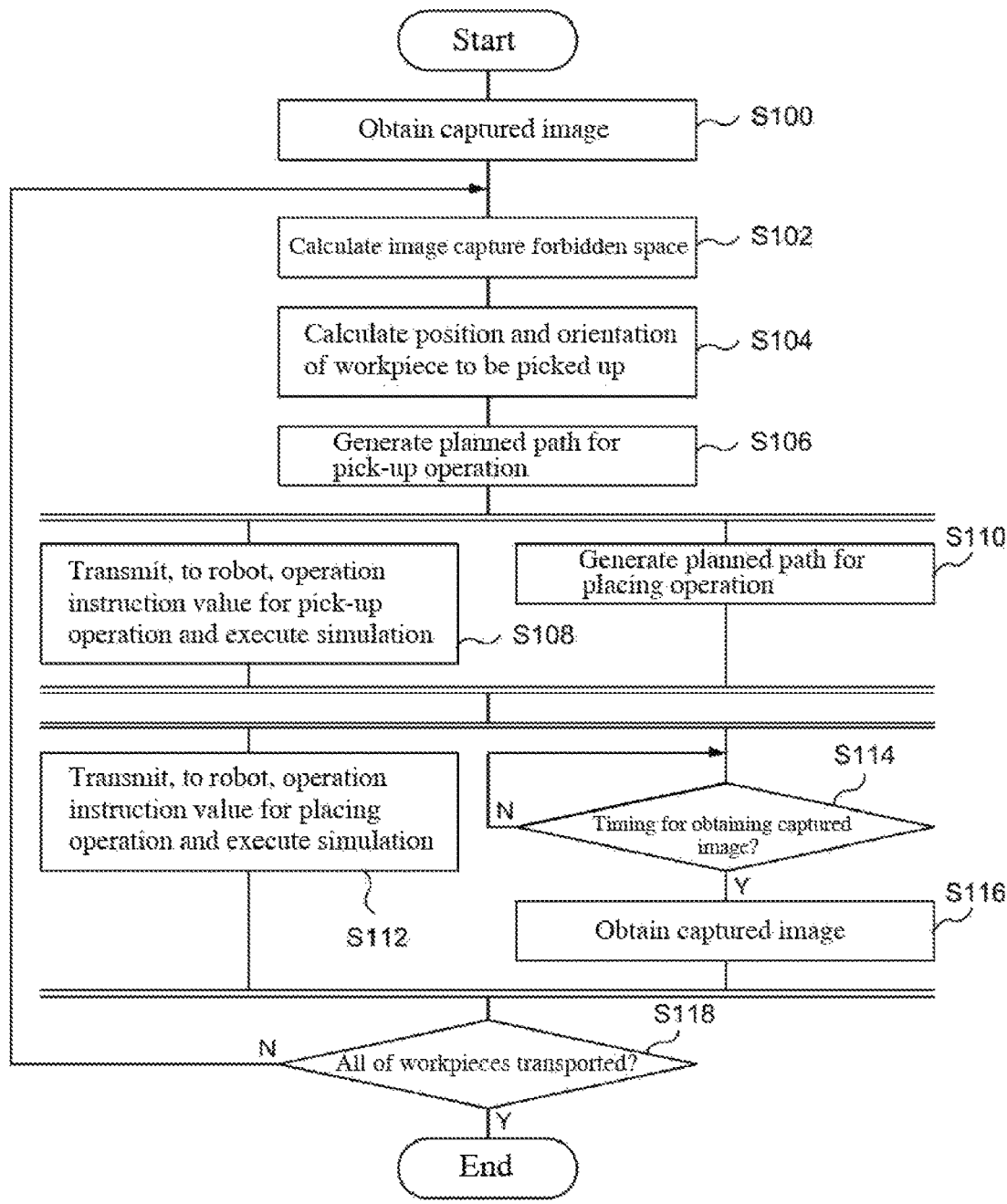
FIG. 5 is a flow diagram illustrating a flow of robot control processing.

FIG. 5 is a flowchart showing a flow of robot control processing executed by the CPU 11 of the robot control device 10. When an instruction to execute the robot control processing is given by an operator, the robot control processing is executed by the CPU 11 reading the robot control program stored in the ROM 12 or the storage 14, expanding the read program onto the RAM 13, and executing it.

Serving as the control unit 34, the CPU 11 instructs the image sensor S to capture an image, and serving as the image obtaining unit 30, the CPU 11 obtains the image captured by the image sensor S (step S100).

Serving as the control unit 34, the CPU 11 reads the visual field range of the image sensor S from the storage unit 36, and calculates an image capture forbidden space based on the captured image obtained from the image sensor S and the visual field range of the image sensor S read from the storage unit 36 (step S102).

Here, "image capture forbidden space" refers to a space in which an image is potentially captured with the workpiece group WS and the robot RB overlapping each other. As described later, when the robot RB is to pick up a workpiece W, the workpiece W to be picked up is selected based on an image captured by the image sensor S. At this time, if an overlap of the workpiece group WS and the robot arm of the robot RB appears in the captured image, it may be difficult to select a workpiece W to be picked up. accordingly, image capture of the image sensor S is forbidden if the robot arm of the robot RB is present in the image capture forbidden space.

In one or more embodiments, as the image capture forbidden space, a space is set in which a first space, which is the visual field range of the image sensor S, and a second space overlap each other, the second space being obtained by taking a region including the workpiece group WS as a bottom area and extending the bottom area to the position of the image sensor S.

Figure 6:
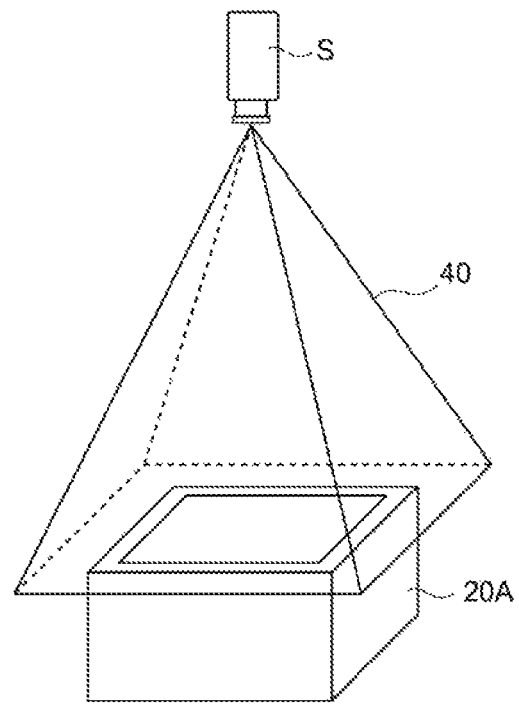
FIG. 6 is a diagram illustrating an example of a first space.
Figure 7:
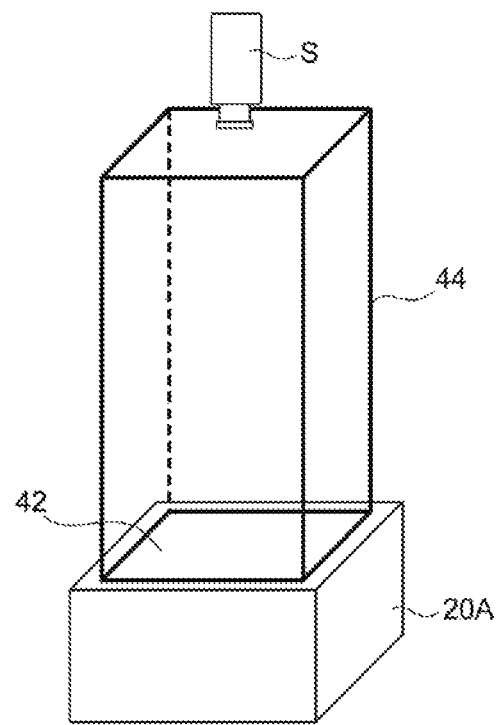
FIG. 7 is a diagram illustrating an example of a second space.
Figure 8:
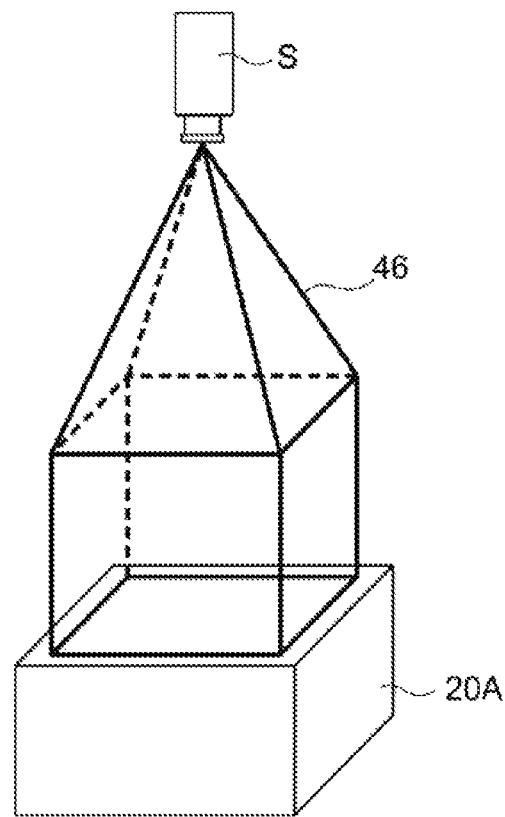
FIG. 8 is a diagram illustrating an example of an image capture forbidden space.

For example, as shown in FIG. 6, a first space 40 that indicates a square pyramid-shaped visual field range is defined as the first space. Also, as shown in FIG. 7, a square columnar second space 44 is defined as the second space, the square columnar second space 44 being obtained by taking a range for receiving the workpiece group WS as a bottom area 42, and extending the bottom area to the position of the image sensor S. In this case, an image capture forbidden space 46 as shown in FIG. 8 can be obtained as the image capture forbidden space in which the first space 40 and the second space 44 overlap each other. Note that the bottom area 42 is an example of a workpiece region of one or more embodiments.

Figure 9:
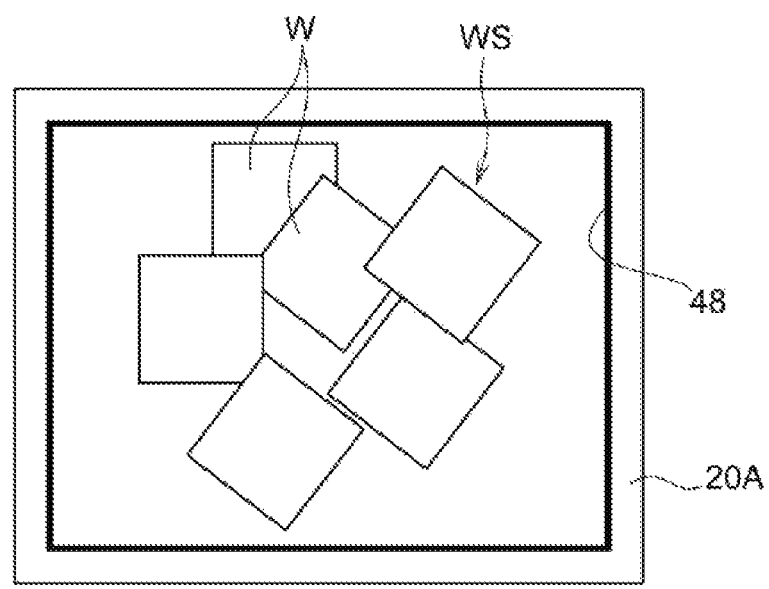
FIG. 9 is a diagram illustrating an example of a bottom area of a second space.

When, as shown in FIG. 9, the receptacle 20A is viewed in a plane view in a direction in which the image sensor S captures an image, the bottom area 42 of FIG. 7 has an inner edge shape 48 of the receptacle 20A. Note that a configuration is also possible in which data indicating the shape of the image capture forbidden space 46 shown in FIG. 8 is stored in advance in the storage unit 36, and the processing in step S102 is omitted.

The shape of the bottom area 42 is not limited to the example of FIG. 9. For example, a configuration is also possible in which a columnar second space with a bottom area having a shape in which the outline of the workpiece group WS is contained is calculated, and a space in which the calculated second space and the first space overlap each other is calculated as an image capture forbidden space.

Figure 10:
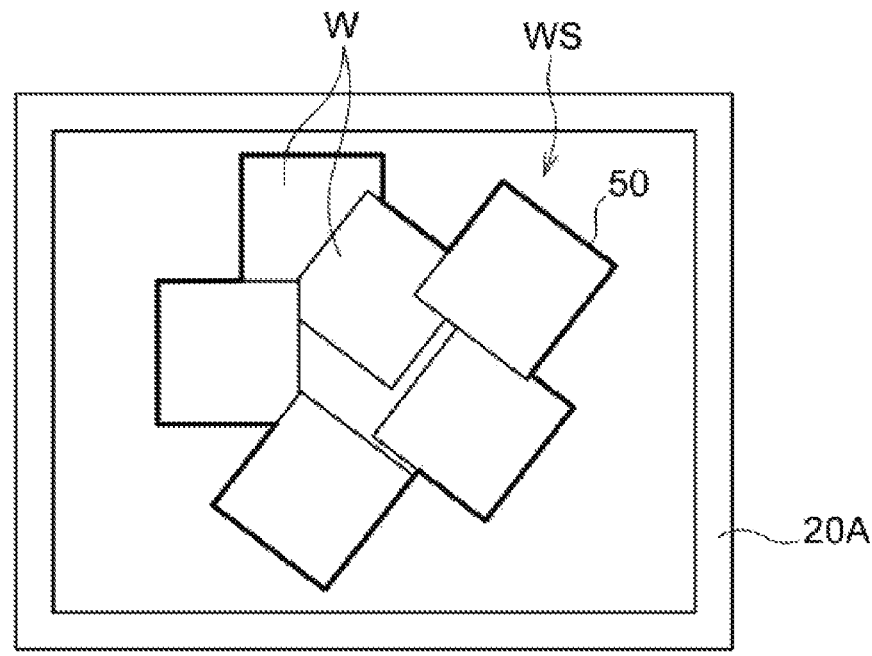
FIG. 10 is a diagram illustrating an example of a bottom area of a second space.

In this case, the shape in which the outline of the workpiece group WS is contained may also be given by a contour 50 that indicates the outline of the workpiece group WS as shown in FIG. 10. In this case, serving as the control unit 34, the CPU 11 executes image processing such as well-known edge extraction processing on the image captured by the image sensor S, and extracts the contour 50 of the workpiece group WS. Then, a columnar second space is calculated by extending the extracted contour 50 to the position of the image sensor S. accordingly, a minimal required second space can be obtained.

Figure 11:
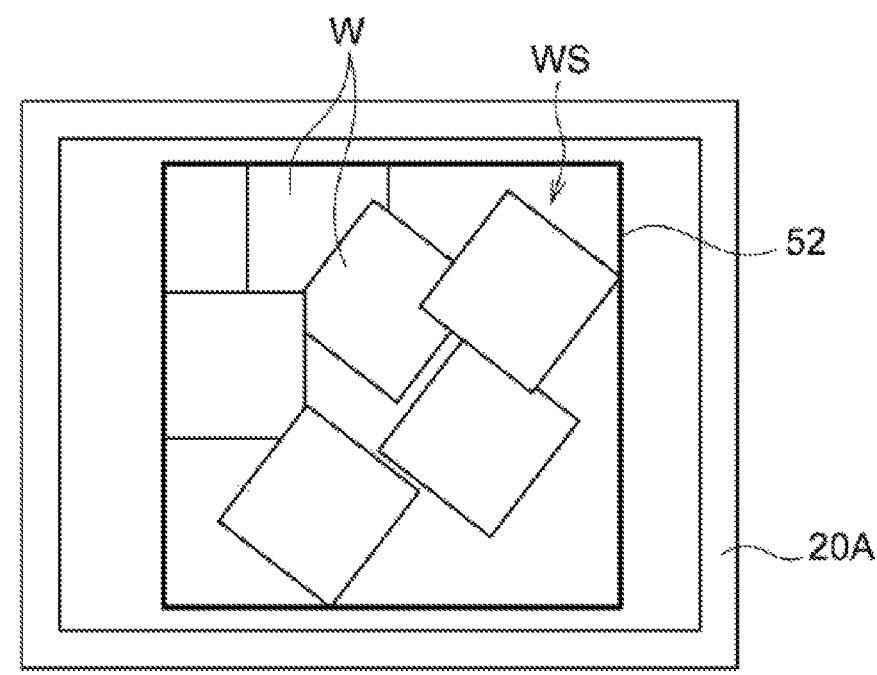
FIG. 11 is a diagram illustrating an example of a bottom area of a second space.

Furthermore, the shape in which the outline of the workpiece group WS is contained may also be a shape that encloses the contour of the workpiece group WS. As shown in FIG. 11 for example, the shape that encloses the contour of the workpiece group WS may also be a circumscribed shape 52 that circumscribes the outline of the workpiece group WS. The circumscribed shape 52 is rectangular in the example of FIG. 11, but may also be circular. Furthermore, the circumscribed shape 52 may also be a convex shape that convexly encloses the workpiece group WS. In the example of FIG. 11, the area of the bottom area can be reduced compared to a case where the bottom area has the inner edge shape 48 of the receptacle 20A. Furthermore, the second space can have a simpler columnar shape compared to a case where the bottom area has the shape given by the contour 50 indicating the outline of the workpiece group WS.

Serving as the control unit 34, the CPU 11 calculates, based on the captured image obtained from the image sensor S, the position and orientation of a workpiece W to be picked up (step S104). For example, by performing well-known edge extraction processing, feature extraction processing, and the like on the captured image, the position and orientation of workpieces W are detected. Then, a workpiece W to be picked up is selected from among the detected workpieces W. Note that examples of criteria for selecting a workpiece W to be picked up include selecting a workpiece W located at the uppermost position of the workpiece group WS, selecting a workpiece W located in the center of the workpiece group WS, and selecting a workpiece W that does not overlap with another workpiece W, but the present invention is not limited to these criteria.

Serving as the control unit 34, the CPU 11 generates a planned path for the pick-up operation (step S106). Specifically, based on the position and orientation of a workpiece W to be picked up that was calculated in step S104, a target orientation (posture) of the robot RB is determined, and a planned path specifying a path from the initial orientation of the robot RB to the target orientation is calculated. Here, the planned path for the robot RB refers to a list of orientations when the robot RB is moved from the initial orientation to the target orientation, that is, a list of rotation angles of the joints J1 to J6 of the robot RB. For the calculation of the planned path, a motion planning method can be used in which a planned path is automatically generated upon designation of an initial orientation and a target orientation. Alternatively, a planned path generated by using a teaching playback method may also be used. In other words, a configuration is also possible in which the robot RB is directly moved to train paths that correspond to the positions and orientations of various workpieces, which are stored in the storage unit 36, and the path, calculated in step S104, that corresponds to the position and orientation of the workpiece W to be picked up is read from the storage unit 36.

Serving as the control unit 34 and the simulation unit 32, the CPU 11 transmits, to the robot RB, an operation instruction value for causing the robot RB to operate in accordance with the planned path generated in step S106, so that the robot RB actually operates, and executes simulation of the same operation as the actual operation of the robot RB (step S108). accordingly, at a timing at which the pick-up operation is actually executed by the robot RB, a pick-up operation is also executed in a simulation by a virtual robot RB. In other words, the pick-up operation by the real robot RB and the pick-up operation in the simulation by the virtual robot RB are executed in parallel to each other. Note that a configuration is also possible in which the operation in the simulation by the robot RB is followed by the operation by the real robot RB, that is, the pick-up operation in the simulation may also be executed slightly prior to the pick-up operation executed by the real robot RB. accordingly, when, in later-described step S114, it is determined in the simulation that the robot arm with the held workpiece W is retracted from the image capture forbidden space 46, and in step S116, the image sensor S is instructed to capture an image, it is possible to match the timing at which the image sensor S is instructed to capture an image with the timing at which the robot RB is actually retracted from the image capture forbidden space 46 as much as possible.

Also, serving as the control unit 34, the CPU 11 executes processing for generating a planned path for the placing operation, in parallel to the processing in step S108 (step S110).

Specifically, a planned path specifying a path from the initial orientation of the robot RB to the target orientation is calculated, where the initial orientation is an orientation of the robot RB when it picks up the workpiece W in the pick-up operation, and the target orientation is an orientation when it places the workpiece W into the receptacle 20B.

Serving as the control unit 34 and the simulation unit 32, the CPU 11 transmits, to the robot RB, an operation instruction value for causing the robot RB to operate in accordance with the planned path generated in step S110, so that the robot RB actually operates, and executes simulation of the same operation as the actual operation of the robot RB (step S112). accordingly, at a timing at which the placing operation is actually executed by the robot RB, a placing operation in the simulation by a virtual robot RB is also executed. In other words, the placing operation by the real robot RB and the placing operation in the simulation by the virtual robot RB are executed in parallel to each other.

Furthermore, the CPU 11 executes, in parallel to the processing in step S112, the processing in steps S114 and S116. In other words, serving as the control unit 34, the CPU 11 determines whether or not the timing to obtain a captured image has come (step S114).

The timing to obtain a captured image is the timing at which, in the simulation, the robot arm with the held workpiece W has just been retracted from the image capture forbidden space 46. To calculate the timing at which the robot arm with the held workpiece W has been retracted from the image capture forbidden space 46, the CPU 11 uses, in the simulation, a well-known interference determination technique for determining whether or not the robot interferes with an obstacle, for example. Here, "interference" refers to a situation in which the robot is in contact with an obstacle. A technique disclosed in, for example, JP 2002-273675A can be used as the well-known interference determination technique.

Figure 12:
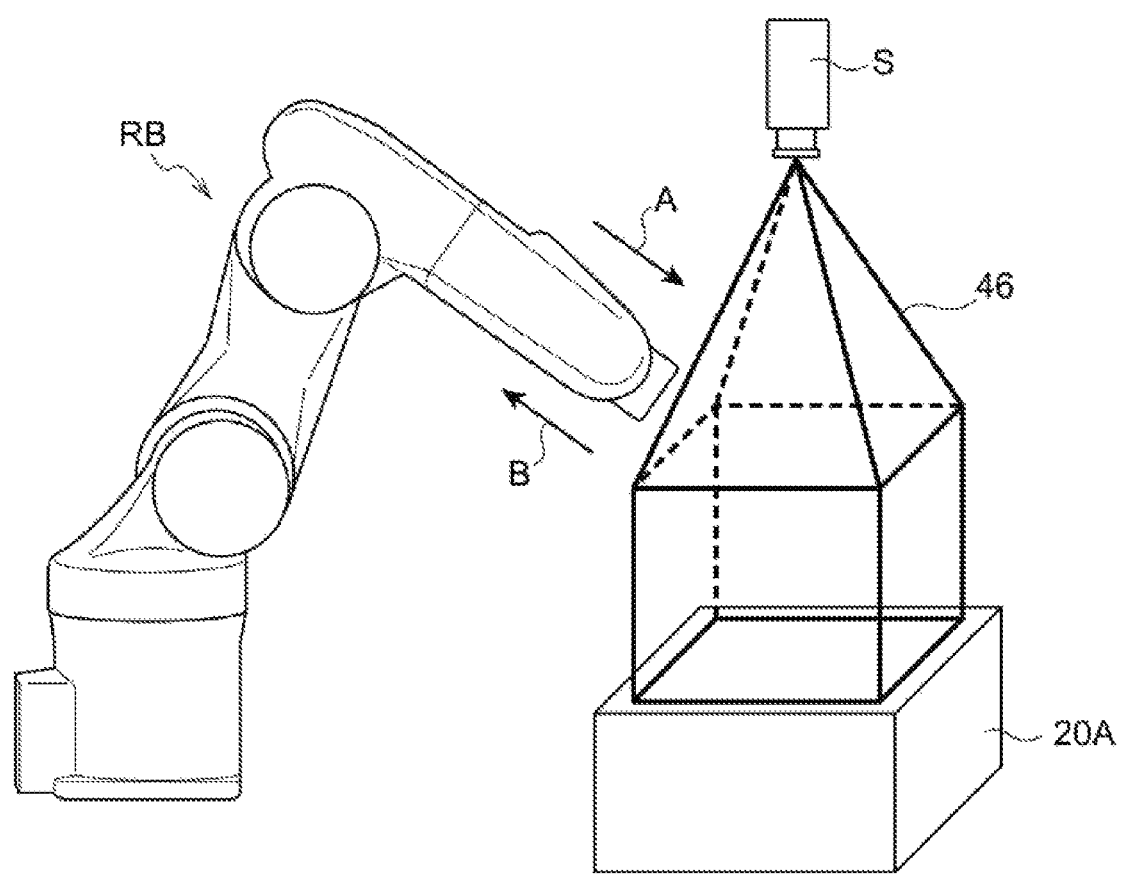
FIG. 12 is a diagram illustrating determination as to whether or not a robot arm is retracted from an image capture forbidden space.

As shown in, for example, FIG. 12, it is conceivable that a timing at which the robot arm of the robot RB is moved in the direction of an arrow A and enters the image capture forbidden space 46 is a timing at which, if the image capture forbidden space 46 is regarded as an obstacle, the robot arm of the robot RB interferes with the obstacle. Note that, in FIG. 12, illustration of the robot hand H and the workpiece W is omitted.

It is also conceivable that the timing at which, after the robot arm of the robot RB enters the image capture forbidden space 46, the robot arm with the held workpiece W is moved in a direction of the arrow B to get out from the image capture forbidden space 46 is a timing at which, if the image capture forbidden space 46 is regarded as an obstacle, the robot arm with the held workpiece W that is interfering with the obstacle is brought into a non-interfering state in which it does no longer interfere therewith.

accordingly, the CPU 11 regards, in the simulation, the image capture forbidden space 46 as an obstacle and determines the timing at which, after the robot arm of the robot RB interferes with the obstacle, the robot arm with the held workpiece W no longer interferes with the obstacle, as the timing at which the robot RB is retracted from the image capture forbidden space 46.

If the timing to obtain a captured image (NO in step S114) has not yet come, the CPU 11 repeats the determination in step S114.

On the other hand, if the timing to obtain a captured image (YES in step S114) has come, then the CPU 11, serving as the control unit 34, instructs the image sensor S, and, serving as the obtaining unit 30, obtains a captured image of the workpiece group WS from the image sensor S (step S116).

The CPU 11 determines whether or not all of the workpieces W of the workpiece group WS have been transported from the receptacle 20A to the receptacle 20B (step S118). Specifically, for example, the CPU 11 subjects the captured image obtained in step S116 to image processing, and determines whether or not there is any workpiece W in the captured image. Furthermore, if the number of workpieces originally received in the receptacle 20A is known in advance, it is also possible to determine whether or not the number of times a workpiece W has been transported reaches the number of workpieces W. Then, if all of the workpieces W have been transported (YES in step S118), this routine is ended. On the other hand, if the transporting of all of the workpieces W is not complete (NO in step S118), the procedure moves to step S102, and the processing from steps S102 to S118 is repeated until all of the workpieces W have been transported. In this case, the initial orientation used when a planned path for the pick-up operation is generated in step S106 is an orientation of the robot RB when a workpiece W is placed in the previous placing operation.

Figure 13:
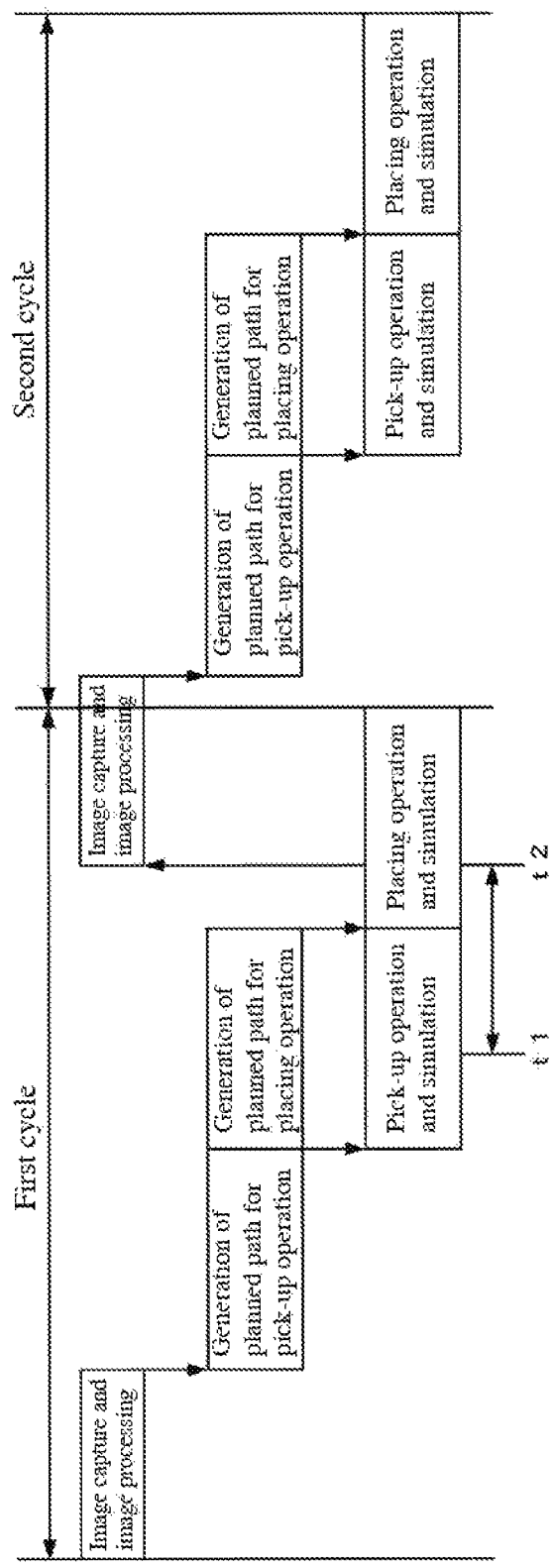
FIG. 13 is a diagram of a timing chart illustrating processes executed in a robot control device.

FIG. 13 shows a timing chart of operations, namely, image capture and image processing (steps S100 to S104), generation of a planned path for the pick-up operation (step S106), pick-up operation and simulation (step S108), generation of a planned path for the placing operation (step S110), and placing operation and simulation (step S112), which are assumed as one cycle. Note that, in FIG. 13, a period of time between t1 and t2 is a period of time in which the robot arm of the robot RB is present in the image capture forbidden space 46. If, in this way, the robot arm of the robot RB enters the image capture forbidden space 46 at the time t1 during the pick-up operation in the first cycle, and the robot arm with the held workpiece W retracts from the image capture forbidden space 46 at the time t2 during the placing operation in the first cycle, it is preferable that image capture in a second cycle be started earlier at the time t2.

In one or more embodiments, simulation of the operation of the robot RB is executed. When, in the simulation, the robot arm with the held workpiece W is retracted from the image capture forbidden space 46, the image sensor S is instructed to capture an image. accordingly, it is possible to promptly capture an image at a timing at which the robot RB is retracted from the image capture forbidden space 46, reducing the time required for one cycle.

The robot control device 10 is not limited to the above-described embodiments, and various modifications are possible. For example, one or more embodiments have described a case in which the image sensor S is a camera that captures a still image, but a camera that captures a moving image may also be used. In this case, the image sensor S continues to capture a moving image during the execution of the procedure in FIG. 5. In steps S100 and S116, control may only be performed such that a frame image is obtained based on the moving image captured by the image sensor S.

Furthermore, one or more embodiments have described a case in which, when the entire robot arm with a workpiece W is retracted from the image capture forbidden space 46, the image sensor S is instructed to capture an image, but the image sensor S may also be instructed to capture an image even when part of the robot arm with a held workpiece W remains in the image capture forbidden space 46. For example, assuming that the bottom area of the second space 44 has the inner edge shape 48 of the receptacle 20A as shown in FIG. 9 or the circumscribed shape 52 that circumscribes the outline of the workpiece group WS as shown in FIG. 11, it is often the case that selection of a workpiece W is not affected even when part of the robot arm with a held workpiece W remains in the image capture forbidden space 46, as long as the robot arm is located at a position within the image capture forbidden space 46 at which it does not overlap the workpiece group WS. accordingly, if the robot arm is located at a position at which it does not overlap the workpiece group WS even in a state in which part of the robot arm with a held workpiece W remains in the image capture forbidden space 46, the image sensor S may also be instructed to capture an image. In this case, in the processing in step S104 in FIG. 5, a workpiece to be picked up may also be selected based on an image obtained by removing the part of the robot arm from the captured image.

Furthermore, the image sensor S may also be instructed to capture an image if it is determined that the robot arm including the robot hand H without a held workpiece W is retracted from the image capture forbidden space 46. Alternatively, the image sensor S may also be instructed to capture an image if it is determined that the robot arm without a held workpiece W and the robot hand H is retracted from the image capture forbidden space 46.

Furthermore, one or more embodiments have described a case where a space in which the first space 40 and the second space 44 overlap each other is defined as the image capture forbidden space 46, but the first space 40 or the second space 44 may also be defined as the image capture forbidden space 46. When the first space 40 is defined as the image capture forbidden space 46, the processing in step S102 in FIG. 5 can be omitted because the first space 40 is predetermined based on the visual field range of the image sensor S. On the other hand, when the second space 44 is defined as the image capture forbidden space 46, time for calculating the image capture forbidden space 46 can be reduced compared to a case where a space is calculated in which the first space 40 and the second space 44 overlap each other. Moreover, a space obtained by adding the first space 40 to the second space 44 may also be defined as the image capture forbidden space 46.

Furthermore, one or more embodiments have described a case where only one image capture forbidden space is set, but a plurality of image capture forbidden spaces may also be set in step S102 in FIG. 5. For example, a plurality of image capture forbidden spaces may be set in which the first space, which is the visual field range of the image sensor S, and a plurality of columnar second spaces overlap each other, the columnar second spaces being obtained by taking a plurality of divided regions into which the workpiece region including the workpiece group WS is divided, as bottom areas, and extending the bottom areas to the position of the image sensor S.

Figure 14:
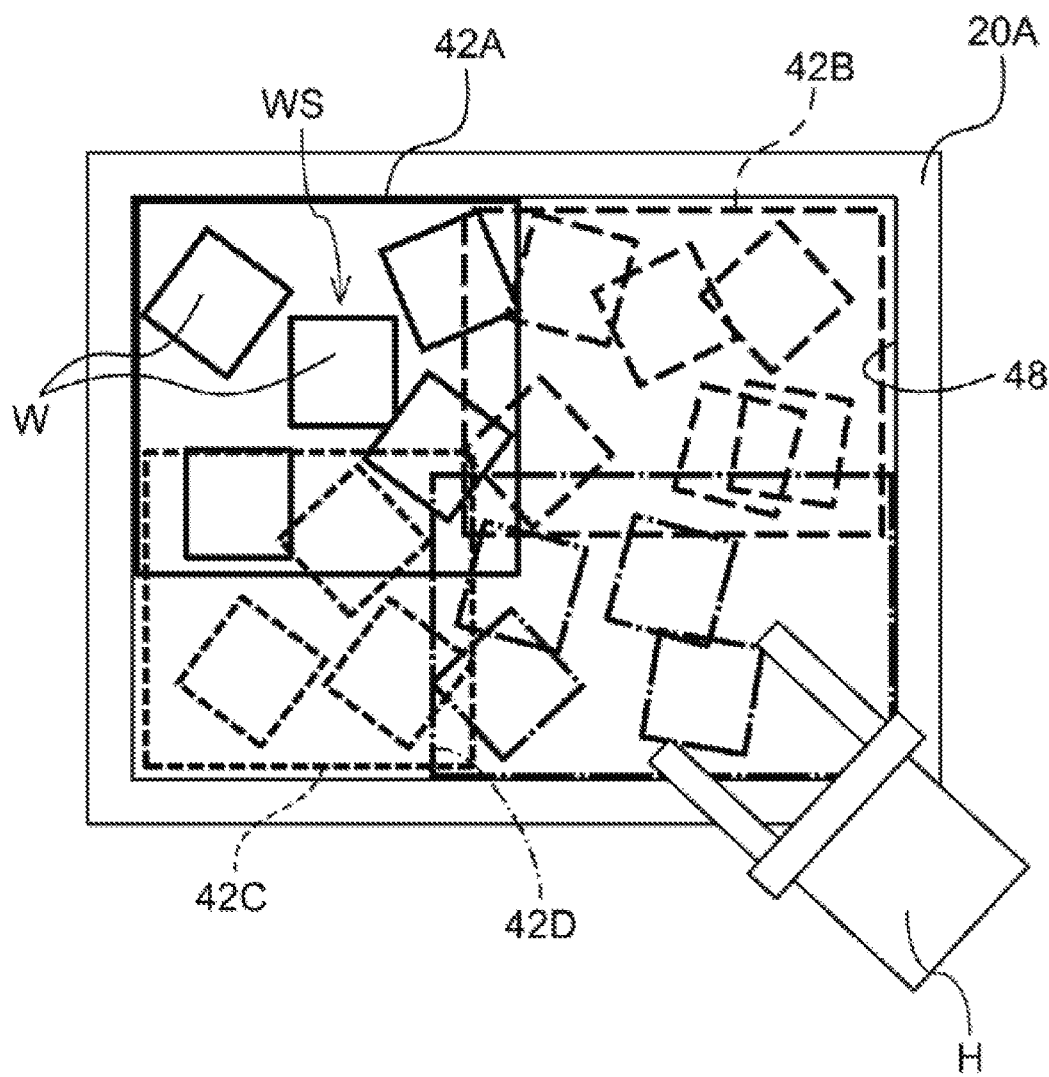
FIG. 14 is a diagram of a plane view illustrating an example of a case where a plurality of image capture forbidden spaces are set.

Specifically, as shown in FIG. 14, when the receptacle 20A is viewed in a plan view in the direction in which the image sensor S captures an image, the inner edge shape 48 of the receptacle 20A is taken as a bottom area, and the bottom area is divided into a plurality of divided regions 42A to 42D, which are taken as bottom areas of the plurality of second spaces. In the example of FIG. 14, the divided regions 42A to 42D are set so that they partially overlap each other. In other words, the plurality of image capture forbidden spaces are set so that they partially overlap each other when viewed in the direction in which the image sensor S captures an image. As a result of the plurality of image capture forbidden spaces partially overlapping each other in this manner, the number of selectable workpieces W in each image capture forbidden space can increase compared to a case where the plurality of image capture forbidden spaces do not partially overlap each other.

Note that the divided regions 42A to 42D may also be set so that the numbers of workpieces W present in the respective divided regions 42A to 42D are equal to each other. In this case, the positions and number of workpieces W are calculated based on a captured image. The sizes of the divided regions 42A to 42D may only be set based on the calculated positions and number of workpieces W.

Figure 15:
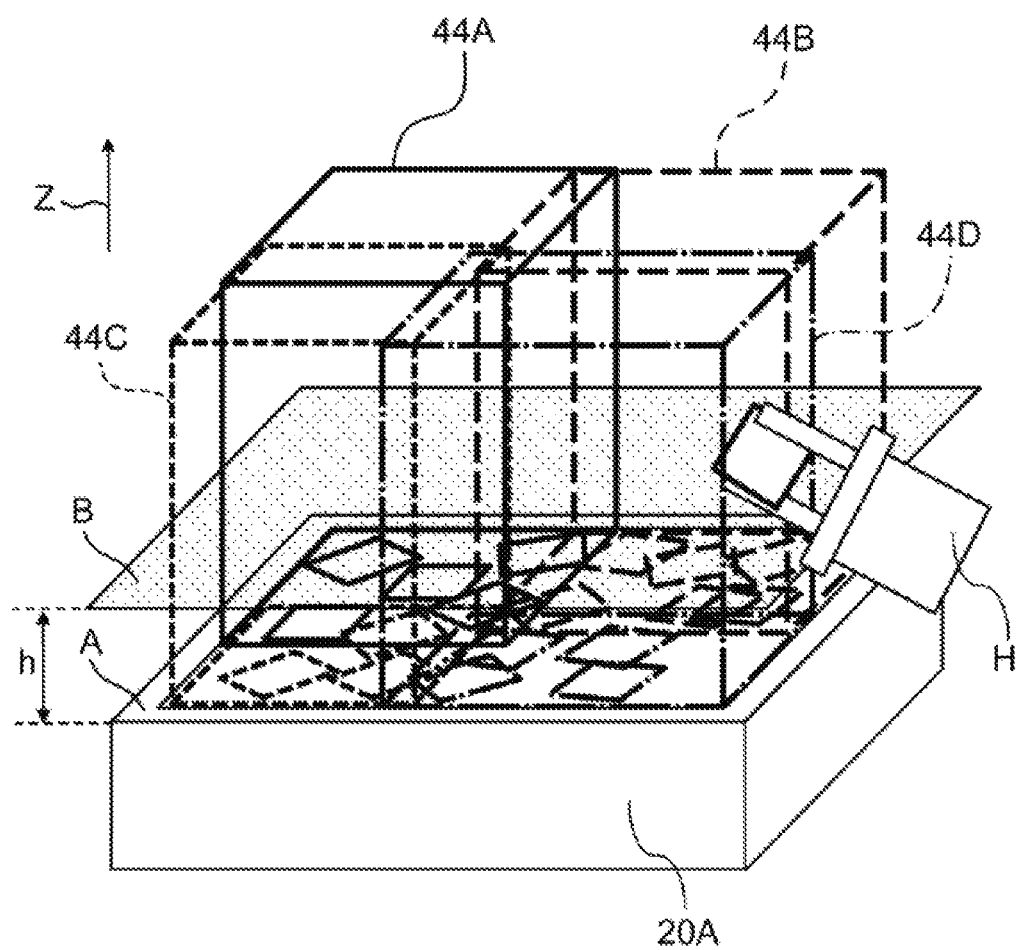
FIG. 15 is a diagram of a perspective view illustrating an example of a case where a plurality of image capture forbidden spaces are set.

FIG. 15 shows examples of columnar second spaces 44A to 44D obtained by taking the divided regions 42A to 42D as bottom areas and extending the bottom areas to the position of the image sensor S.

Note that, in the example of FIG. 14, the divided regions 42A to 42D are set so that they partially overlap each other, but it is also possible that two or three of the divided regions 42A to 42D partially overlap each other. Alternatively, the plurality of image capture forbidden spaces may also be set so that the divided regions 42A to 42D do not overlap each other, but, in this case, the divided regions 42A to 42D need to be set so that all of the workpieces of the workpiece group WS are contained in the plurality of image capture forbidden spaces.

Figure 16:
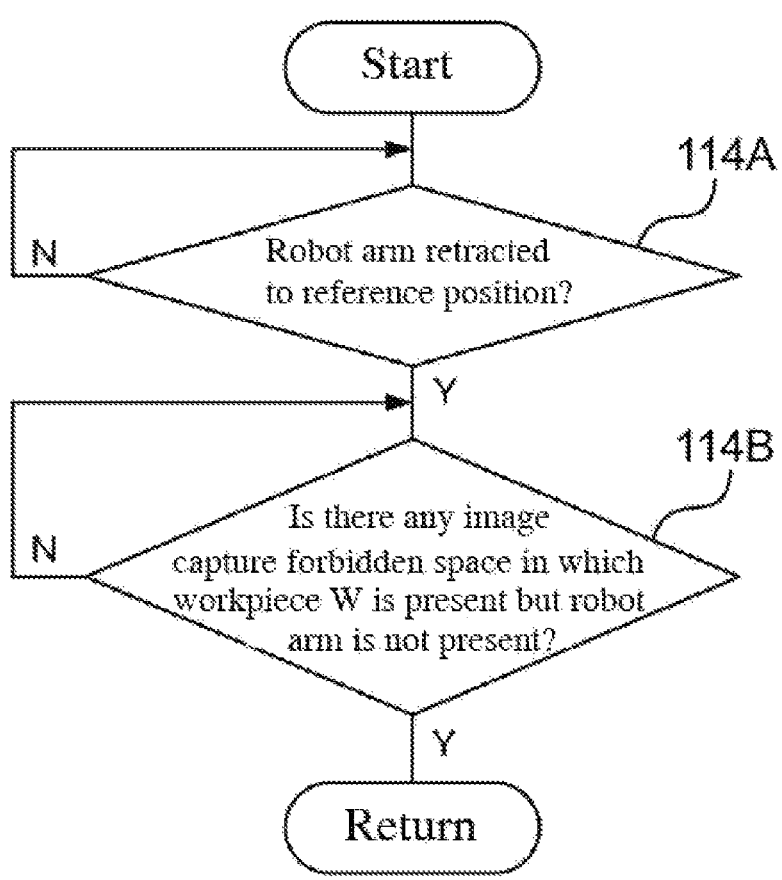
FIG. 16 is a flow diagram illustrating an example of processing for determining a timing at which a captured image is obtained when a plurality of image capture forbidden spaces are set.

If a plurality of image capture forbidden spaces are set, processing shown in FIG. 16 is executed in step S114 in FIG. 5. First, the CPU 11 determines, in the simulation, whether or not the robot arm is retracted to a reference position at which it does not affect the layout of the workpiece group WS (step S114A). In other words, it is determined whether or not the robot arm is retracted to a position at which it is not in contact with a workpiece W and does not change the layout of the workpiece group WS. Here, "reference position" refers to, as shown in FIG. 15 for example, a position that is distanced away from an upper surface A of the receptacle 20A in a Z direction, which is a height direction, by a predetermined distance h. In this case, as shown in FIG. 15, if the robot arm is located at a height at or above a surface B located at a position distanced away from the upper surface A of the receptacle 20A in the Z direction by the distance h, the determination in step S114A results in YES.

Note that a reference position may also be set based on, for example, the captured image obtained in step S100 in FIG. 5, and the shape and size of workpieces W. Specifically, the position of the uppermost one of the workpieces W loaded in bulk is estimated based on the captured image and the shape and size of the workpieces W, and based on the estimated positon of the bulk, the height from the bottom area of the receptacle 20A to the uppermost position of the workpiece group WS is estimated. Then, the position distanced away from the estimated uppermost position of the workpiece group WS in the Z direction by a predetermined distance h is set as a reference position. Furthermore, a configuration is also possible in which, each time a captured image is obtained in step S116 in FIG. 5, the height from the bottom area of the receptacle 20A to the uppermost position of the workpiece group WS is estimated based on the captured image and the shape and size of workpieces W, and the position distanced away from the estimated position in the Z direction by a predetermined distance h is set as a reference position.

Then, if, in the simulation, the robot arm is retracted to the reference position (YES in step S114A), that is, the robot arm is not in contact with a workpiece W and does not affect the layout of the workpiece group WS, the procedure moves to step S114B. On the other hand, if the robot arm is not retracted to the reference position (NO in step S114A), that is, the robot arm may get into contact with a workpiece W and may affect the layout of the workpiece group WS, the processing in step S114A is repeated until the robot arm is retracted to the reference position.

The CPU 11 determines whether or not, out of the image capture forbidden spaces that correspond to the divided regions 42A to 42D, there is any image capture forbidden space in which any workpiece W is present but the robot arm is not present (step S114B). If, out of the image capture forbidden spaces that correspond to the divided regions 42A to 42D, there is any image capture forbidden space in which any workpiece W is present but the robot arm is not present (YES in step S114B), the procedure moves to step S116 in FIG. 5. On the other hand, if, out of the image capture forbidden spaces that correspond to the divided regions 42A to 42D, there is no such an image capture forbidden space (NO in step S114B), the processing in step S114B is repeated until the determination in step S114B results in YES.

Note that the determination as to whether or not any workpiece W is present is performed in the following manner. When step S102 in FIG. 5 is first executed, and an image capture forbidden space is set for each of the divided regions 42A to 42D, the number of workpieces W is calculated as an initial value for each of the divided regions 42A to 42D by subjecting the captured image to image processing, and the calculated numbers of workpieces W are stored in the storage unit 38. Then, each time a pick-up operation is executed in step S108 in FIG. 5, out of the numbers of workpieces W stored in the storage unit 38, the number of workpieces W that corresponds to the divided region for which the pick-up operation is executed is decremented. Then, by determining whether or not the number of workpieces W stored in the storage unit 38 is zero, it is determined whether or not any workpiece W is present. Alternatively, each time step S116 in FIG. 5 is executed, the number of workpieces W is calculated for each of the divided regions 42A to 42D by subjecting the captured image to image processing, and the calculated numbers of workpieces W are stored in the storage unit 38. Then, when executing the subsequent step S114B, it is determined whether or not any workpiece W is present by determining whether or not the number of workpieces W stored in the storage unit 38 is zero.

In this way, if, out of the image capture forbidden spaces that correspond to the divided regions 42A to 42D, there is any image capture forbidden space in which any workpiece W is present but the robot arm is not present, it is determined that the timing to obtain a captured image has come. A case is assumed in which, for example, a workpiece W in the divided region 42A shown in FIG. 14 is picked up, and the robot arm is retracted from the image capture forbidden space that corresponds to the divided region 42A. In this case, even if part of the robot arm remains in at least one of the image capture forbidden spaces that correspond to the other divided regions 42B to 42D, it is possible to select the workpiece W from at least the divided region 42A as long as the workpiece W remains in the divided region 42A. accordingly, by determining that the timing to obtain a captured image has come if the robot arm is retracted from at least one of a plurality of image capture forbidden spaces, it is possible to promptly obtain a captured image.

Furthermore, one or more embodiments have described a case where one or more aspects are applied to pick-up operation in which the robot RB picks up a workpiece W, but one or more aspects are also applicable to placing operation in which the robot RB places the workpiece W held by itself into the receptacle 20B. In this case, an image sensor is installed at a position above the receptacle 20B, an image capture forbidden space is calculated based on an image captured by this image sensor, and the position at which a workpiece W is to be placed is determined. Then, the image sensor may only be instructed to capture an image when the robot arm that has placed the workpiece W into the receptacle 20B is retracted from the image capture forbidden space.

Furthermore, in one or more embodiments, a well-known interference determination technique is used in the simulation to determine the timing at which the robot RB is retracted from the image capture forbidden space 46, but it is also possible to determine the timing at which the robot RB is retracted from the image capture forbidden space 46 based on a planned path of the robot RB. Specifically, based on the planned path for the placing operation generated in step S110 in FIG. 5, a retraction time period from a point in time when the robot RB picks up a workpiece W to a point in time when the robot RB retracts from the image capture forbidden space 46 is calculated. Then, in the simulation, the timing at which the retraction time period from a point in time when the robot RB picks up the workpiece W elapses may only be determined as a timing at which it retracts from the image capture forbidden space 46.

Note that the robot control processing executed by the CPU reading software (a program) in the above-described embodiments may also be executed by various types of processors other than the CPU. Examples of the processors in this case include a programmable logic device (PLD) such as a field-programmable gate array (FPGA), whose circuit configuration can be changed after the manufacture, and a dedicated electric circuit such as an application specific integrated circuit (ASIC), which is a processor having a circuit configuration designed only to execute specific processing. Furthermore, the robot control processing may also be executed by one of these types of processors, or a combination of two or more processors of the same or different types (for example, a plurality of FPGAs, and a combination of a CPU and a FPGA). Furthermore, the hardware structures of the various types of processors are more specifically electric circuits obtained by combining circuit elements such as semiconductor elements.

Furthermore, the above-described embodiments have described a case where the robot control program is stored (installed) in advance in the storage 14 or the ROM 12, but the present invention is not limited to this. The program may also be provided in such a form that it is recorded in a recording medium such as a compact disk read only memory (CD-ROM), a digital versatile disk read only memory (DVD-ROM), or a universal serial bus (USB) memory. Furthermore, the program may also be downloaded from an external device via a network.

LIST OF REFERENCE NUMERALS

1 Pick-and-place device
10 Robot control device
20A, 20B Receptacle
30 Obtaining unit
32 Simulation unit
34 Control unit
36 Storage unit
40 First space
42 Bottom area
44 Second space
46 Image capture forbidden space
50 Contour
52 Circumscribed shape

The invention claimed is:

1. A robot control device comprising:
a processor configured with a program to perform operations comprising:
operation as an obtaining unit configured to obtain a captured image from an image sensor configured and positioned at a position to capture an image of a workpiece group to be handled by a robot;
operation as a simulation unit configured to execute simulation of operation of the robot; and
operation as a control unit configured to perform control such that an image captured by the image sensor is obtained in response to, in the simulation, the robot being retracted from at least one image capture forbidden space extending above the workpiece group, in which an image is potentially captured with the workpiece group and the robot overlapping each other, the image capture forbidden space being a space comprising one or both of: a first space, comprising a visual field range of the image sensor; and at least one columnar second space comprising a workpiece region including the workpiece group or a plurality of divided regions into which the workpiece region is divided, as a bottom area, which extends toward the sensor to the position of the image sensor.

2. The robot control device according to claim 1, wherein the image capture forbidden space comprises a space in which the first space and the second space overlap each other.

3. The robot control device according to claim 2, wherein the processor is configured with the program to perform operations such that operation as the control unit is configured to calculate the second space with a bottom area having a shape in which an outline of the workpiece group is contained, and calculate, as the image capture forbidden space, a space in which the calculated second space and the first space overlap each other.

4. The robot control device according to claim 3, wherein the shape in which an outline of the workpiece group is contained is given by a contour that indicates the outline of the workpiece group, or is a shape that encloses the contour of the workpiece group.

5. The robot control device according to claim 4, wherein the shape that encloses the contour of the workpiece group comprises a circumscribed shape that circumscribes the outline of the workpiece group or an inner edge shape of a receptacle in which the workpiece group is accommodated.

6. The robot control device according to claim 1, wherein
the image sensor comprises an image sensor configured to capture a still image, and
the processor is configured with the program to perform operations such that operation as the control unit is configured to control the image sensor to start image capture at a timing at which, in the simulation, the robot has been retracted from the image capture forbidden space.

7. The robot control device according to claim 1, wherein
the image sensor comprises an image sensor configured to capture a moving image, and
the processor is configured with the program to perform operations such that operation as the control unit is configured to perform control such that a frame image is obtained based on the moving image captured by the image sensor at a timing at which, in the simulation, the robot has been retracted from the image capture forbidden space.

8. The robot control device according to claim 1, wherein
a plurality of image capture forbidden spaces are set, and
the processor is configured with the program to perform operations such that operation as the control unit is configured to perform control such that an image captured by the image sensor is obtained in response to the robot being retracted from at least one of the plurality of image capture forbidden spaces.

9. The robot control device according to claim 8, wherein at least two of the plurality of image capture forbidden spaces partially overlap each other in a direction in which the image sensor captures an image.

10. The robot control device according to claim 8, wherein, in response to a robot arm of the robot being retracted to a reference position at which the robot arm does not affect a layout of the workpiece group, and, out of image capture forbidden spaces that correspond to the divided regions, any image capture forbidden space being in which a workpiece is present but the robot arm is not present, the processor is configured with the program to perform operations such that operation as the control unit is configured to perform control such that an image captured by the image sensor is obtained.

11. A robot control method in which a computer executes processing, the processing comprising:
obtaining a captured image from an image sensor configured and positioned at a position to capture an image of a workpiece group to be handled by a robot;
executing a simulation of operation of the robot; and
performing control such that an image captured by the image sensor is obtained in response to, in the simulation, the robot being retracted from at least one image capture forbidden space extending above the workpiece group, in which an image is potentially captured with the workpiece group and the robot overlapping each other, the image capture forbidden space being a space comprising a one or both of: a first space, comprising a visual field range of the image sensor; and at least one columnar second space comprising a workpiece region including the workpiece group or a plurality of divided regions into which the workpiece region is divided, as a bottom area, which extends toward the sensor to the position of the image sensor.

12. A non-transitory computer-readable storage medium storing a robot control program, which when read and executed causes a computer to perform operations comprising:

operation as an obtaining unit configured and positioned at a position to obtain a captured image from an image sensor configured to capture an image of a workpiece group to be handled by a robot;

operation as a simulation unit configured to execute simulation of operation of the robot; and operation as a control unit configured to perform control such that an image captured by the image sensor is obtained in response to, in the simulation, the robot being retracted from at least one image capture forbidden space extending away from the workpiece group, in which an image is potentially captured with the workpiece group and the robot overlapping each other, the image capture forbidden space being a space comprising one or both of: a first space, comprising a visual field range of the image sensor; and at least one columnar second space comprising a workpiece region including the workpiece group or a plurality of divided regions into which the workpiece region is divided, as a bottom area, which extends toward the sensor to the position of the image sensor.

* * * * *